(12) United States Patent
Kortesalmi

(10) Patent No.: US 10,301,796 B2
(45) Date of Patent: May 28, 2019

(54) METHOD AND ARRANGEMENT FOR TRANSFERRING A HEAVY WORK MACHINE ON A SLOPING BASE

(71) Applicant: SLEIPNER FINLAND OY, Jyvaskyla (FI)

(72) Inventor: Ossi Kortesalmi, Jyvaskyla (FI)

(73) Assignee: Sleipner Finland Oy, Jyvaskyla (FI)

( * ) Notice: Subject to any disclaimer, the term of this patent is extended or adjusted under 35 U.S.C. 154(b) by 0 days.

(21) Appl. No.: 15/597,322

(22) Filed: May 17, 2017

(65) Prior Publication Data

US 2017/0254047 A1 Sep. 7, 2017

Related U.S. Application Data

(63) Continuation-in-part of application No. PCT/FI2015/050859, filed on Dec. 7, 2015.

(30) Foreign Application Priority Data

Dec. 8, 2014 (FI) .................................... 20146074

(51) Int. Cl.
*E02F 9/00* (2006.01)
*B60T 1/14* (2006.01)
(Continued)

(52) U.S. Cl.
CPC .............. *E02F 9/003* (2013.01); *B60P 3/062* (2013.01); *B60P 3/127* (2013.01); *B60T 1/14* (2013.01);
(Continued)

(58) Field of Classification Search
CPC ..... E02F 9/003; E02F 3/32; E02F 3/38; E02F 3/962; E02F 9/2083; B60P 3/062; B60P 3/127; B60T 1/14; B62D 53/061
See application file for complete search history.

(56) References Cited

U.S. PATENT DOCUMENTS

| 1,337,062 A | * | 4/1920 | Franklin | ................. | C01B 13/11 |
| | | | | | 422/186.19 |
| 2,698,491 A | * | 1/1955 | Felt | ......................... | E02F 3/841 |
| | | | | | 172/316 |

(Continued)

FOREIGN PATENT DOCUMENTS

| CN | 202641665 | 1/2013 |
| EA | 201690418 | 8/2016 |

(Continued)

OTHER PUBLICATIONS

International Search Report, International Application No. PCT/FI2015/050859, dated Mar. 24, 2016.

(Continued)

*Primary Examiner* — Jacob D Knutson
(74) *Attorney, Agent, or Firm* — Fildes & Outland, P.C.

(57) ABSTRACT

A method for slowing transfer of a heavy work machine on a sloping base using a separate transportation device equipped with wheels, the work machine including a set of booms having at least one operating cylinder, an auxiliary device, and a brake including a brake surface, the method including the steps of towing the work machine using a transfer vehicle and the transportation device, supporting the work machine at least partly on top of the transportation device such that the crawler chassis is raised off the sloping base, and supporting the auxiliary device on the brake, the brake surface of the brake contacting the sloping base, using the operating cylinder to press the brake surface against the sloping base to create friction to slow transfer speed of the transportation device, and adjusting pressing of the brake surface taking place through the auxiliary device using the operating cylinder.

19 Claims, 18 Drawing Sheets

(51) Int. Cl.
  B62D 53/06    (2006.01)
  B60P 3/06     (2006.01)
  B60P 3/12     (2006.01)
  E02F 3/96     (2006.01)
  E02F 9/20     (2006.01)
  E02F 3/32     (2006.01)
  E02F 3/38     (2006.01)
  E02F 3/30     (2006.01)
  E02F 3/40     (2006.01)

(52) U.S. Cl.
  CPC .............. *B62D 53/061* (2013.01); *E02F 3/32* (2013.01); *E02F 3/38* (2013.01); *E02F 3/962* (2013.01); *E02F 9/2083* (2013.01); *E02F 3/308* (2013.01); *E02F 3/401* (2013.01)

(56)  References Cited

U.S. PATENT DOCUMENTS

| | | | |
|---|---|---|---|
| 2,775,314 A | 12/1956 | Hiemstra | |
| 3,027,662 A * | 4/1962 | Cunningham, Jr. | E02F 3/7668 172/247 |
| 3,169,650 A | 2/1965 | Soyland | |
| 4,501,334 A * | 2/1985 | Ptacek | B62D 11/02 172/832 |
| 5,212,897 A | 5/1993 | Jefferson | |
| 5,601,303 A | 2/1997 | Underwood | |
| 7,267,354 B2 * | 9/2007 | Cunningham | B60D 1/145 280/402 |
| 9,290,215 B2 * | 3/2016 | Smith | B60D 1/14 |
| 2003/0044265 A1 | 3/2003 | French et al. | |
| 2004/0144586 A1 | 7/2004 | Trott | |
| 2010/0214094 A1 | 8/2010 | Givens et al. | |
| 2013/0298796 A1 * | 11/2013 | LeGard | B60F 1/043 105/215.2 |
| 2014/0052350 A1 * | 2/2014 | Tsuruga | E02F 3/325 701/50 |
| 2015/0267378 A1 * | 9/2015 | Murtha | E02F 3/964 37/410 |
| 2016/0176252 A1 | 6/2016 | Kortesalmi | |
| 2016/0280118 A1 * | 9/2016 | Plas | B60P 3/062 |

FOREIGN PATENT DOCUMENTS

| | | | |
|---|---|---|---|
| EP | 3 036 148 | 6/2016 | |
| GB | 1044074 | 9/1966 | |
| GB | 2149369 A * | 6/1985 | ................ E02F 3/30 |
| JP | S56 3053 | 1/1981 | |
| JP | 10-217922 | 8/1998 | |
| JP | 2014122511 A * | 7/2014 | ............. E02F 3/435 |
| RU | 2494893 | 10/2013 | |
| WO | 98/47747 | 10/1998 | |
| WO | 2013/124543 | 8/2013 | |
| WO | 2015/025077 | 2/2015 | |

OTHER PUBLICATIONS

Finnish Search Report, in Finnish Application No. 20146074, dated Jul. 30, 2015.
English language abstract of RU 2494893.
English language abstract of JP 10-217922.
English language abstract of CN 202641665.
Supplementary Search Report in EP 15 86 7638 dated Jun. 13, 2018.
Eurasian Office Action dated Nov. 14, 2018 and English language translation.
Enjlish language abstract of EA 201690418 from corresponding document WO2015025077.
Chilean Office Action dated Jun. 21, 2018.
Chilean Office Action dated Oct. 19, 2018.

* cited by examiner

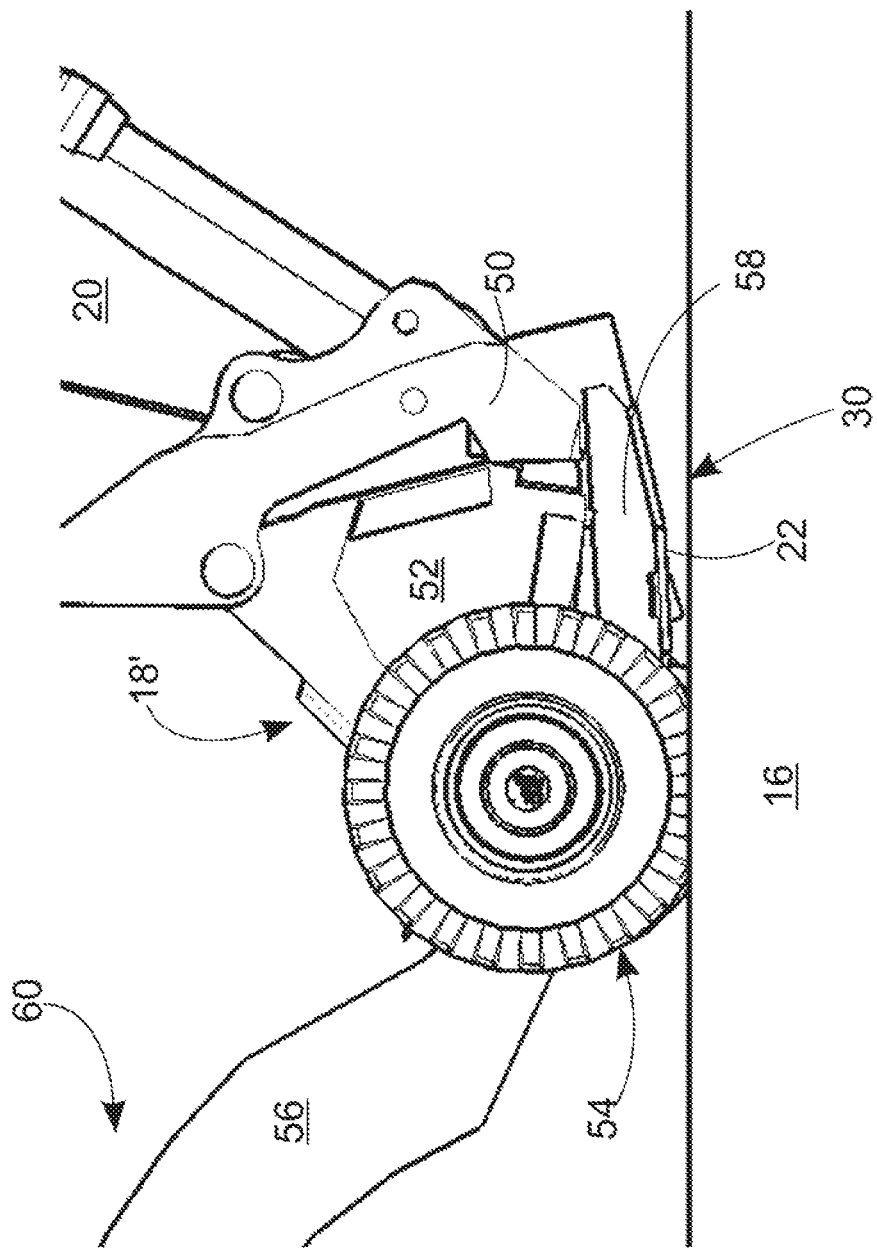

METHOD AND ARRANGEMENT FOR TRANSFERRING A HEAVY WORK MACHINE ON A SLOPING BASE

This application claims benefit of priority from International Patent Application No: PCT/FI2015/050859 filed Dec. 7, 2015, which claims benefit of Finland Patent Application No. 20146074, both of which are incorporated by reference in their entirety.

FIELD OF THE INVENTION

The invention relates to a method for slowing transfer of a heavy work machine on a sloping base, in which the work machine includes a body, a crawler chassis fitted beneath the body, and a sat of booms pivoted at its one end to the work machine, at the other end of which is a selected auxiliary device, and a transportation device is equipped with wheels, in which method the work machine is transferred by supporting the work machine on the crawler chassis at least partly on top of the transportation device, and towing the work machine using the transfer vehicle with the aid of the transportation device and using friction to slow the transfer speed of the transportation device on the sloping base. The invention also relates to an arrangement for transferring a heavy work machine on a sloping base.

BACKGROUND OF THE INVENTION

The transfer of heavy excavators equipped with crawler tracks, for example, in mines and quarries, is problematic. It is sought to avoid long transfers of excavators with suspensions equipped with crawler tracks, as long transfers are slow and wear the suspensions unnecessarily, shortening their service life.

Patent publication FI 101779 B is known from the prior art disclosing a transportation device for moving an excavator from one place to another on wheels. The excavator is driven on its crawler tracks partly on top of the wheels and the crawler traces of the excavator are finally raised off the ground with the aid of a set of booms supported on the load space of a transfer vehicle, for example, a dump truck, with the aid of the bucket of the excavator. In this way, the excavator can be moved rapidly and without stressing the tracks from one work site to another.

However, a problem in such, a solution is the great mass of an excavator when moving it on a sloping base. When then moving an excavator using the transportation device according to the aforementioned patent, the towing transfer vehicle must be responsible for producing power both to transfer and to brake the excavator. When correctly dimensioned, the power of the transfer vehicle will be sufficient for the transfer; but braking effect often becomes a problem. At a mine, an excavator or other work machine must often be transferred on a sloping base, i.e. downhill, when a great deal of braking effect will be required. The brakes of the transfer vehicle will then be insufficient to produce the necessary braking power, or at least will operate at the extreme limit of their capacity.

In addition, a problem in such transfers is the slipperiness of the sloping base, for example, in winter or in rain, when an excavator or work machine with a great mass can push the transfer vehicle downhill in front of it, causing a great hazard. The base material too can be slippery. The safety philosophy of the sector is generally based on the idea that the speed, of transfer of all moving work machines must be such that they can be stopped if necessary. In addition to excavators, the problem can also appear in connection with other heavy work machines equipped with a work boom.

SUMMARY OF THE INVENTION

The invention is intended to create a method that is safer and simpler than methods of the prior art for transferring a heavy work machine, by means of which the braking effect can be increased. This intention can be achieved by means of a method for slowing transfer of a heavy work machine on a sloping base using a transportation device equipped with wheels, the work machine comprising a body, a crawler chassis fitted beneath the body, a set of booms having at least one operating cylinder, a first end and a second end, said set of booms being pivoted at the first end to the work machine and a selected auxiliary device having a brake surface is pivoted at the second end, in which method transferring the work machine by supporting the work machine on the crawler chassis at least partly on top of the transportation device, towing the work machine using a transfer vehicle with the aid of the transportation device, using said operating cylinder of the set of booms to press said brake surface of the auxiliary device attached to the second end of the set of booms against the sloping base to create friction to slow transfer speed of the transportation device on the sloping base, adjusting pressing of the brake surface taking place through the auxiliary device using the operating cylinder of the set of booms.

The invention is also intended to create a safer and simpler arrangement than arrangements of the prior art in connection with a heavy work machine, by means of which the braking effect can be increased. This intention can foe achieved by means of an arrangement for transferring a heavy work machine on a sloping base, in which arrangement the heavy work machine comprising a body, a crawler chassis fitted under the body and a set of booms having at least one operating cylinder, a first end and a second end, said set of booms being pivoted at the first end to the work machine, and the arrangement includes a transportation device equipped with wheels, on top of which transportation device the work machine is arranged to be at least partly supported for duration of transfer, a transfer vehicle for towing the work machine during the transfer, the work machine being at least partly supported on top of the transportation device, a selected auxiliary device at the second end of said set of booms at a distance from the body, said auxiliary device having a brake surface for retarding the transfer speed of the work machine with the aid of friction arranged to be pressed against the sloping base by using said operating cylinder of the set or booms with the aid of the auxiliary device to brake the transfer speed of the work machine during the transfer with the aid of friction an operating device for using the operating cylinder to press the brake surface of the auxiliary device against the sloping base.

The idea of the method according to the invention is to continuously brake the transfer of a work machine equipped with a set of booms on a sloping base while it is being transferred, making separate brakes unnecessary. This also creates a safer way to transfer a heavy work machine equipped with a set of booms, as, if a fault develops in the transfer vehicle, the work machine equipped with a set of booms will stop itself, thanks to the continuous braking. More specifically, the intention of the method according to the invention can be achieved with the aid of a method for slowing the transfer of a heavy work machine on a sloping base, in which the work machine includes a body, a crawler chassis fitted under the body, and a set of booms, which is pivoted at its one end to the work machine and at the other end of which is a selected auxiliary device. The transportation device is equipped with wheels. In the method, the work machine is moved by supporting the work machine on its crawler chassis at least partly on fop of the transportation device, towing the work machine using the transfer vehicle with the aid of the transportation device, using the auxiliary device to press a brake surface against the base to retard the transfer speed, and to use the set of booms to adjust the pressing of the brake surface created through the auxiliary device. In this way, the transfer speed, of the transportation device is slowed on a sloping base by using friction. In the method according to the invention, the braking effect is created by means of friction between the braking surface and the base, exploiting the mass of the heavy work machine by using the operating cylinder of the set of booms to press the brake surface of the auxiliary device against the sloping base. During braking, the pressing on the brake surface, which is supported on the base, is increased with the aid of the set of booms of the work machine, by means of the auxiliary device. Using the method according to the invention, the importance of the braking effect of the transfer vehicle is reduced and by using a transfer vehicle with sufficient towing power very large work machines equipped with sets of booms can be transferred downhill too in a controlled manner and safely.

The set of booms preferably includes one or more sequentially pivoted booms. With the aid of the set of booms, the bucket preferably acting as the auxiliary device can be rotated to several different attitudes, depending on the operating situation.

According to one embodiment, in the method a pair of transfer wheels fitted to only one end of the work machine is used as the transportation device. The weight can then be distributed in a suitable ratio between the pair of transfer wheels and the brake surface, using the set of booms to create the desired braking effect.

In the method, the work machine is preferably towed by the transfer vehicle by means of a rope. A rope will have sufficient strength for the purpose, but be considerably lighter than a steel cable of similar strength. In addition, if it breaks, a rope will, not cause a danger corresponding to a steel cable, the internal tension of which causes a sharp movement in the ends of the cable in a breaking situation.

The rope used is preferably as marine-industry rope, for example, a rope of polyethylene with a high molecular weight, sold under the Dyneema trademark, which is processed by stretching to achieve a high molecular orientation and crystallinity of the molecules. The molecular orientation of polyethylene manufactured in this way is more than 95% and the crystallinity of the molecules more than 85%.

The mass of the work machine can be more than 50 tn, preferably more than 100 tn. Longer transfers of such work machines are particularly slow and wearing on the crawler chassis. When transferring such machines on a sloping base, the braking effect of the transfer vehicle often becomes a limiting factor to the transfer.

The brake surface is preferably arranged in connection with the set of booms. The pressing of the brake surface against the ground can be easily adjusted with the aid of the set of booms.

According to one embodiment, the transfer speed is slowed by supporting the brake surface continuously on the base, so that the brake surface is towed continuously with the aid of the transfer vehicle. In other words, the brake surface or transfer vehicle incorporating a brake surface attached to the work machine by means of an auxiliary device, is towed continuously, i.e. the work machine being transferred requires the towing power of the transfer vehicle downhill too, or else the work machine will stop automatically.

The towing power can be directed through the set of booms to the following work machine. The work machine connected to the brake surface with the aid of the set of booms will then steadily follow the towing transfer vehicle.

The work machine equipped with a set of booms is advantageously an excavator and the brake surface is fitted to the excavator in connection with its bucket.

The braking effect is preferably adjusted by altering the attitude of the brake surface. Thus, the braking effect can be simply adjusted from the work machine to suit each situation. By adjusting the braking effect, savings can be achieved in the fuel consumption of the transfer vehicle.

According to one embodiment, the braking effect can be adjusted by adjusting the distance between the brake surface and the work machine. Such an adjustment, is limited, however, by the limited power produced by the set of booms, which prevents the bucket from being brought very close to the work machine.

According to a second embodiment, the operator adjusts the braking effect manually from the work machine. To implement the method, all that is required, in addition to the systems available in transfers of the prior art, is a brake surface fitted in connection with the set of booms of the work machine. The operator can adjust the braking effect by rotating the bucket, for example on the basis of feedback given by the driver of the transfer vehicle, or by visually estimating the braking effect.

According to a third embodiment, the braking effect is measured actively and the braking effect is adjusted automatically on the basis of the measurement data. The excavator can then be braked during the transfer without active operation by the excavator driver.

The braking effect is preferably maximal when starting to move and the braking effect is reduced once the excavator is moving by altering the attitude of the bucket. Reducing the braking effect during transfer saves fuel in the transfer while the maximal braking effect when starting the transfer in turn ensures sufficient transfer power in the transfer vehicle.

The towing power between the transfer vehicle and the work machine is preferably measured with the aid of a sensor. The measurement result can be displayed to the drivers of both the transfer vehicle and the work machine, who can adjust the towing power and braking on the basis of this information.

The objective of the arrangement according to the invention can, in turn, be achieved by means of an arrangement for transferring a heavy work machine on a sloping base, which heavy work machine includes a body, a crawler chassis fitted under the body, and a set of booms pivoted at its one end to the work machine, and at the other end of which is a selected auxiliary device. The arrangement includes a transportation device equipped with wheels, on top of which the work machine is arranged to be at least partly supported during the transfer, a transfer vehicle for towing the work machine during the transfer when the work machine is at least partly supported on top of the transportation device, and brake means for slowing the transfer speed of the work machine with the aid of friction. The brake means is a brake surface at a distance from the body, arranged to be pressed against the base to brake, with the aid of friction, the transfer speed of the work machine during the transfer. With the aid of the brake surface, the mass of the work machine can be exploited to create sufficiently high friction between the brake surface and the base to create sufficient retardation under all circumstances. The construction is economical to implement and operate.

The heavy work machine is preferably an excavator, which includes a set of booms with a bucket pivoted to it. Excavators can be very heavy, which aggravates the problem of braking on a sloping base.

According to one embodiment, the brake surface is a separate drag plate, which is attached to the bucket. Thus, the bucket can be a bucket according to the prior art, which can be retrofitted with the necessary brake surface. In addition, the separate piece can be easily changed when the brake surface wears in use.

According to a second embodiment, the brake surface is a brake area formed in the bucket. The brake surface is then an integrated part of the bucket and thus extremely strong. In addition, a brake surface belonging to the bucket is a simpler totality to manufacture than a brake surface separately attached to the bucket.

The brake surface preferably includes at least two brake areas with different coefficients of friction. Thus, by altering the attitude of the work machine's brake surface, the coefficient of friction between the brake surface and the ground can be altered, simultaneously altering the braking effect.

According to one embodiment, each brake area is at an angle of 5-25°, preferably 10-15° to the adjacent brake area. Thus, when the excavator's bucket is rotated around the pivot point between it and the set of booms, the bucket's brake surface changes between brake areas of a different size and coefficient of friction. Thus, the braking effect can be easily adjusted for different surface formations and conditions of the base.

In the arrangement, a tope is preferably used to tow the work machine, which rope is a rope known from marine industry, described in the method.

The arrangement can include a towing rope arranged between the transfer vehicle and the excavator for towing the excavator and an anchor point formed in the said bucket for attaching the towing rope or cable to the excavator. The anchor point permits the excavator to be towed from near to the brake surface.

In the arrangement, the jaw-crashing surfaces of a jaw crusher are preferably used as the brake surface. These are pieces of an extremely durable material, which can be adapted almost directly as brake surfaces. Alternatively, a brake surface especially suitable for the purpose can be manufactured from a corresponding material.

The arrangement according to the invention is preferably arranged to be used with the aid of the method according to the invention described above.

According to a third embodiment, the arrangement includes a separate transfer trailer, which is arranged to be towed by a transfer vehicle, and which includes a arm for attaching the transfer trailer to the transfer vehicle, a second arm supported on the first arm with the aid of a transverse pivot, wheels that are supported with the aid of an axle on the second arm, a brake surface for braking the transfer of the work machine, fitted to the undersurface belonging to the second arm, a support plane for supporting the bucket on the transfer trailer, and locking means arranged in connection with the support plane for locking the bucket to the transfer trailer. With the aid of such an arrangement, the brake surface can be simply kept off the base during transfers taking place on a level base, but again use the set of booms to press the brake surface onto the base when braking on a hill.

The second arm can form the support plane. Such an implementation is particularly suitable for transfer trailers, which are towed by a heavy transfer vehicle, in which the towing adhesion is sufficient.

Alternatively, the arm can form the support plane. Such an implementation is particularly suitable for transfer trailers that are towed by lighter transfer vehicles, in which case, by pressing the arm by the set of booms of the work machine, additional, mass is transferred to the transfer vehicle, in order to improve towing adhesion.

BRIEF DESCRIPTION OF THE DRAWINGS

In the following, the invention is described in detail with reference to the accompanying drawings showing some embodiments of the invention, in which FIGS. 11a and 11b show a side view the operation of the brake surface of a third embodiment according to the invention, FIG. 12 shows a partial side cross-section of the third embodiment of FIG. 11a.

DETAILED DESCRIPTION OF THE INVENTION

Figure 1A:
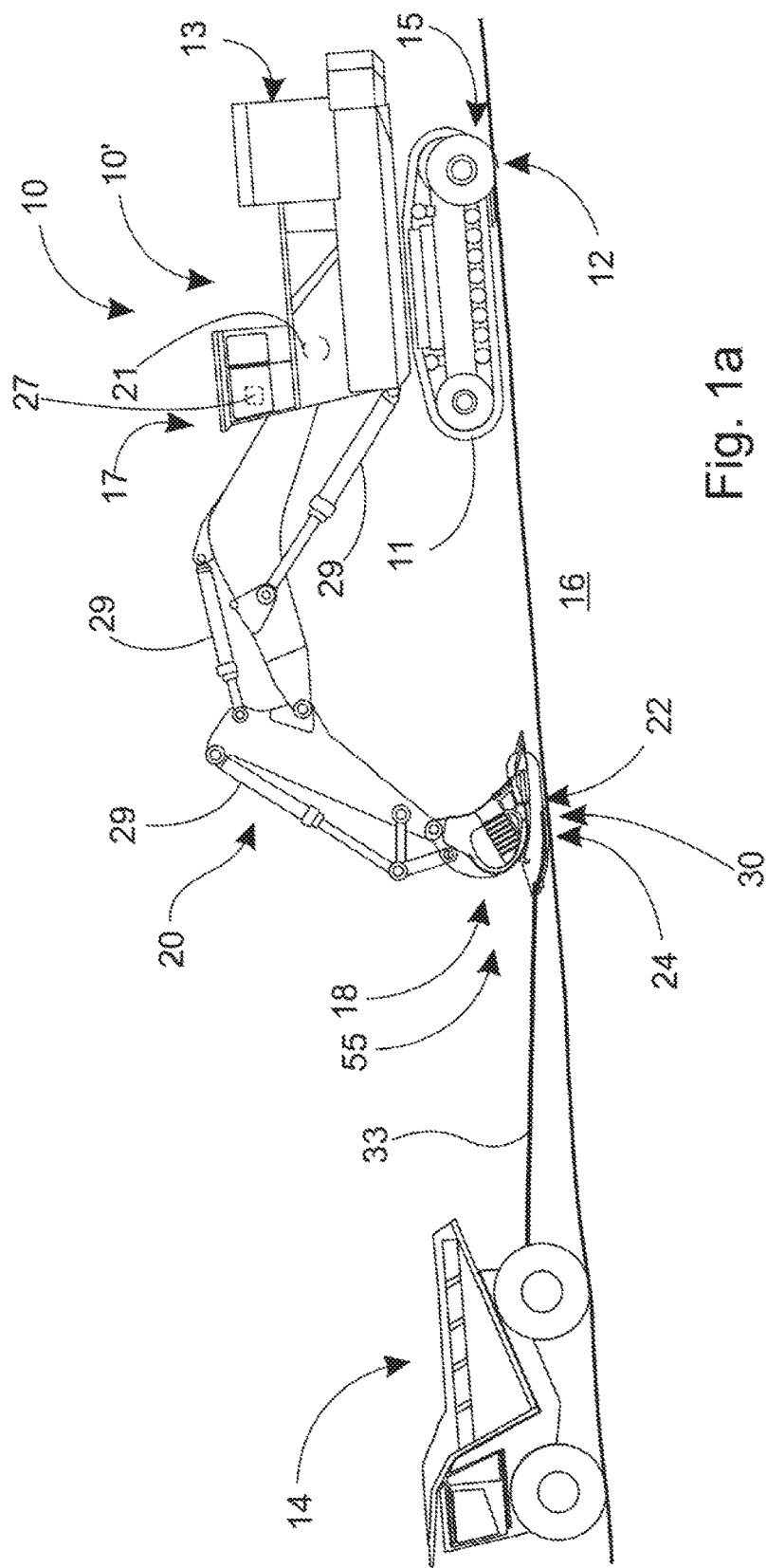
FIG. 1a shows an overall side view of the arrangement according to the invention, in which an excavator is towed by a transfer vehicle during transfer.

FIG. 1a shows a side view of the construction of the arrangement according to the invention. According to FIG. 1a, the arrangement includes a heavy work machine 10 preferably equipped with a set of booms 20, which is transported, with the aid of a transportation device 12 preferably equipped with wheels 15, by towing the work machine 10, for example, by means of a rope 33, with a transfer vehicle 14. The set of booms 20 is pivoted at its one end 17 to the body 13 belonging to the work machine 10, with the aid of a pivot 21. The set of booms 20 also includes at least one operating cylinder 29. Instead of the rope, a cable can also be used, but a rope is a lighter and safer implementation. FIGS. 1*a*-4 show a preferred embodiment of the invention, in which the heavy work machine 10 equipped with a set of booms 20 is an excavator 10', which includes an auxiliary device 55, i.e. in this case a bucket 18, pivoted to the set of booms 20. Instead of a bucket, the auxiliary device can also be some other auxiliary device at the end of the set of booms, which is used in a heavy work machine. The heavy work machine equipped with a set of booms can also be, for example, a bulldozer, a drilling unit, or some similar work machine, in which there is preferably a crawler chassis 11. In addition, the arrangement includes brake means 30. The work machine 10 can be towed toy a transfer vehicle with the brake means 30 in front, according to FIG. 1*a*, in which case the towing force is advantageously directed through the set of booms 20 to the following work machine 10. Alternatively, the work machine 10 can also be towed according to FIG. 1*b*, in which case the towing force is directed directly to the work machine 10, which is partly on top of a transportation device 12. In this connection, the term set of working booms can also be used for the set of booms.

Figure 1B:
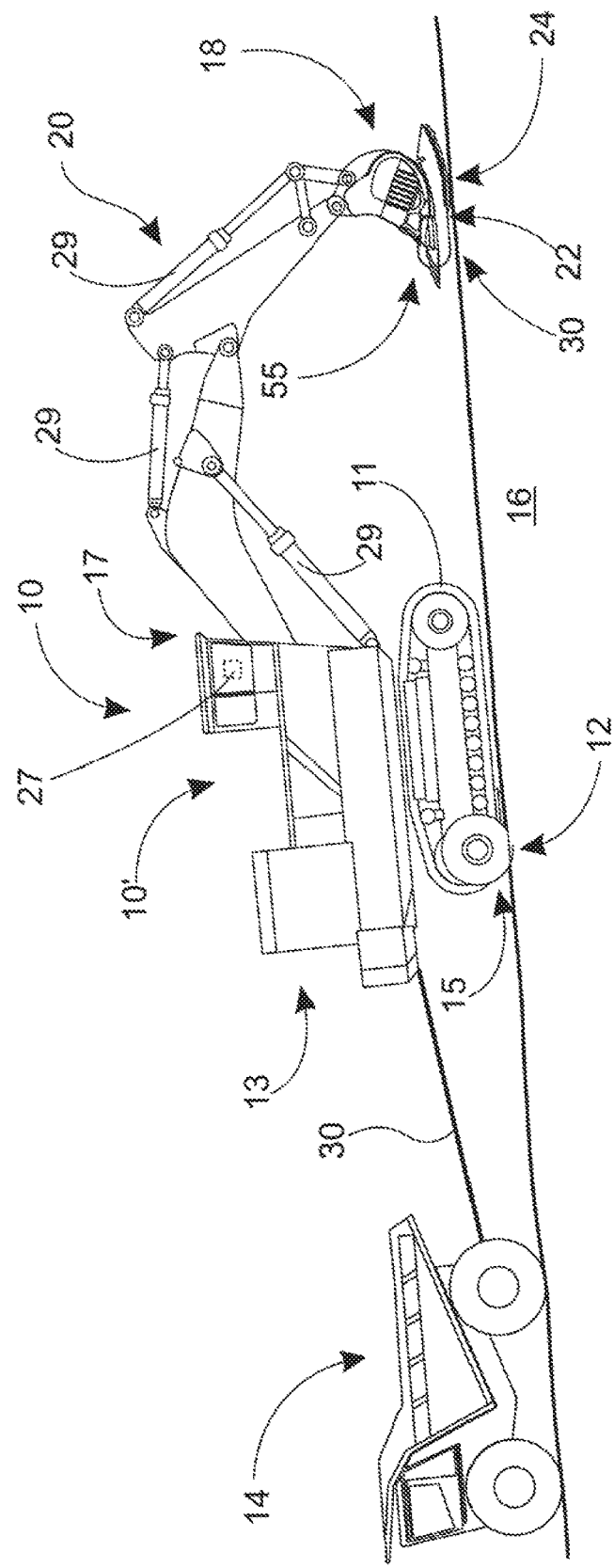
FIG. 1b shows an overall side view of the arrangement according to the invention, in which an excavator is towed by a transfer vehicle during transfer, in an opposite sequence to that in FIG. 1a, FIG. 1c shows an overall side view of an arrangement according to a second embodiment, in which an excavator is towed by a transfer vehicle during transfer.
Figure 1C:
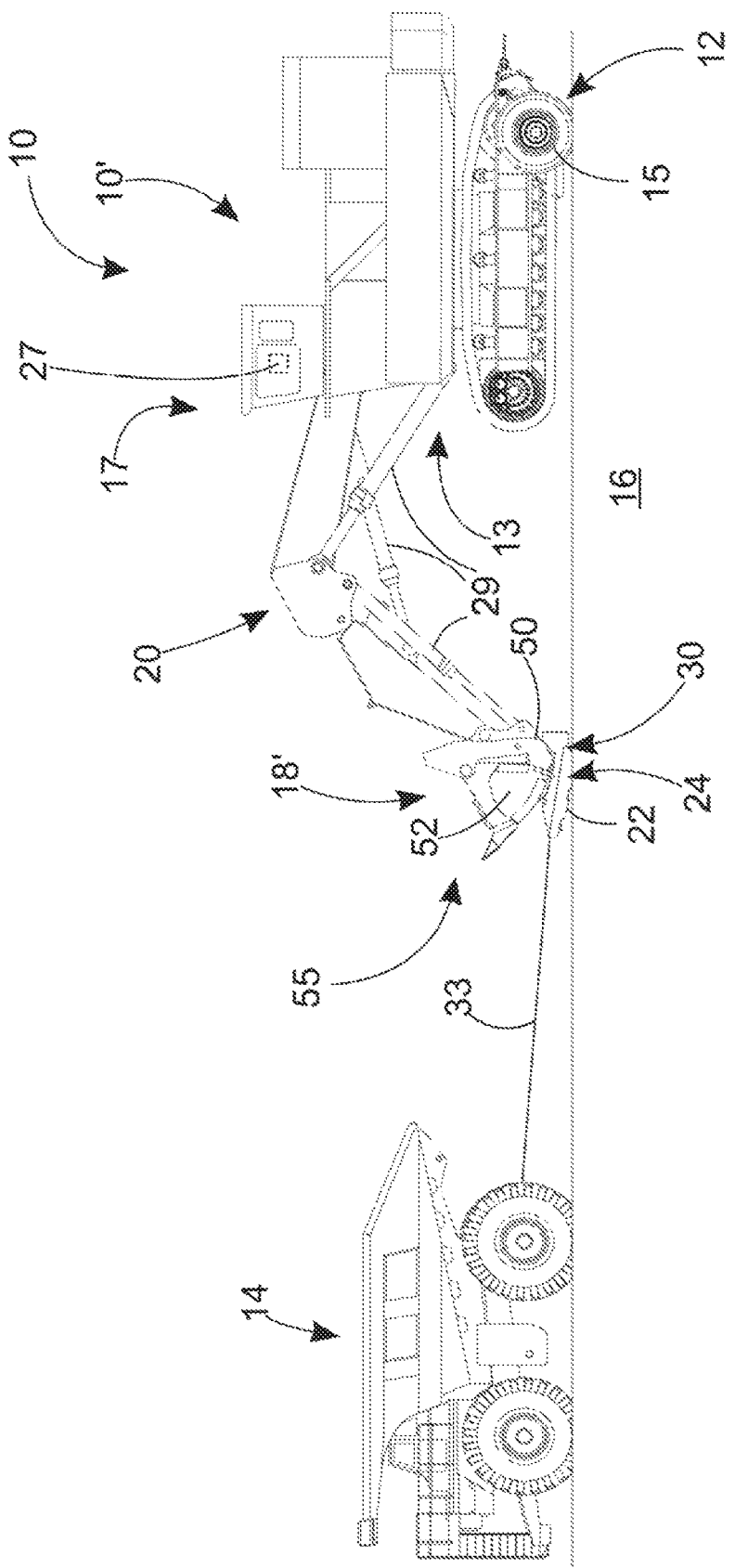

FIG. 1*c* shows a second embodiment of the arrangement, is which the work machine 10 is an excavator equipped with a dipper shovel 18'. When using a dipper shovel 18', the brake means 30 differ slightly in construction from the embodiment of FIGS. 1*a* and 1*b*, mainly due to the operating attitude of the dipper shovel 18'. The dipper shovel 18' differs in construction from the bucket 18 of the embodiment of FIGS. 1*a* and 1*b* in that the dipper shovel 18' consists of a body part 50 and a jaw part 52 pivoted to it 52. The dipper shovel is loaded with the jaw part 52 closed on the body part 50 and is discharged, in turn, by opening the jaw part 52 by rotating it around the pivot, according to FIGS. 5 and 6.

Differing from the embodiments of FIGS. 1*a*-1*c*, the transportation device can also be, for example, a transportation device equipped with sliding surfaces. Similarly, the work machine to be transferred can also be a work machine that is implemented without a set of booms. In that case, the brake surface is attached to the chassis of the work machine with the aid of a separate pivot mechanism and adjustment of the braking effect still takes place by rotating the brake surface. Preferably, the transportation device is, however, for example, the Sleipner set of wheels made generally known by the applicant.

According to the invention, the excavator 10' of FIG. 1*a* is supported on the transportation device 12 in such a way that the excavator's 10' crawler chassis 11 can be raised off the base 16, i.e. preferably off the surface of the ground or road. The excavator's 10' crawler chassis 11 is raised off the base 16 by using the excavator's 10' set of booms 20, which is used to press the ground with the aid of a bucket 18 suspended from the set of booms 20, until the crawler chassis 11 rises off the base 16. The set of booms 20 is pressed by using the operating cylinder 29 of the set of booms 20 which is controlled with a operating device 27, for example a joystick, included in the arrangement. In the arrangement and method according to the invention, the transportation device 12 can be a pair of transfer wheels like that shown in FIG. 1*a* or, for example, a traditional transportation carriage, by means of which the excavator's crawler chassis is raised off the base. In the method according to the invention, the weight of the excavator 10' is directed to the base 16 through the transportation device 12 and the brake means 30 connected to the bucket 18 of the excavator 10'.

In the method according to the invention, the transfer downhill of the excavator 10' takes place preferably by towing the excavator 10' on the transportation device 12 with the transfer vehicle 14, when it is supported, continuously on the base 16 with the aid of the brake means 30 connected to the work machine 10. In the embodiment of FIGS. 1*a*-4, the brake means 30 are attached to the excavator's 10' bucket 18. During the transfer, the movement of the excavator 10' is retarded by continuous dragging on the ground by means or the brake surface. The transfer preferably requires continuous pulling by the transfer vehicle, as the force continuously directed advantageously to the ground through the brake surface causes such a great resistance that the excavator will stop, even when going downhill, without continuous towing. Using the method according to the invention, the decisive criterion in terms of the transfer is the towing power of the transfer vehicle, and not its braking power, contrary to the methods according to the prior art. Further, preferably by altering the attitude of the brake surface, i.e. for example, the attitude of the bucket 18 of the excavator 10', the retardation can be adjusted as required. Retardation can also be adjusted by altering the distance of the brake surface from the excavator, when the distribution of the weight of the excavator between the transportation device and the brake surface will change. Depending on the slipperiness of the base, the friction between the base and the brake surface can be altered by altering the attitude of the brake surface, so that it will be sufficient to stop the work machine.

Figure 2:
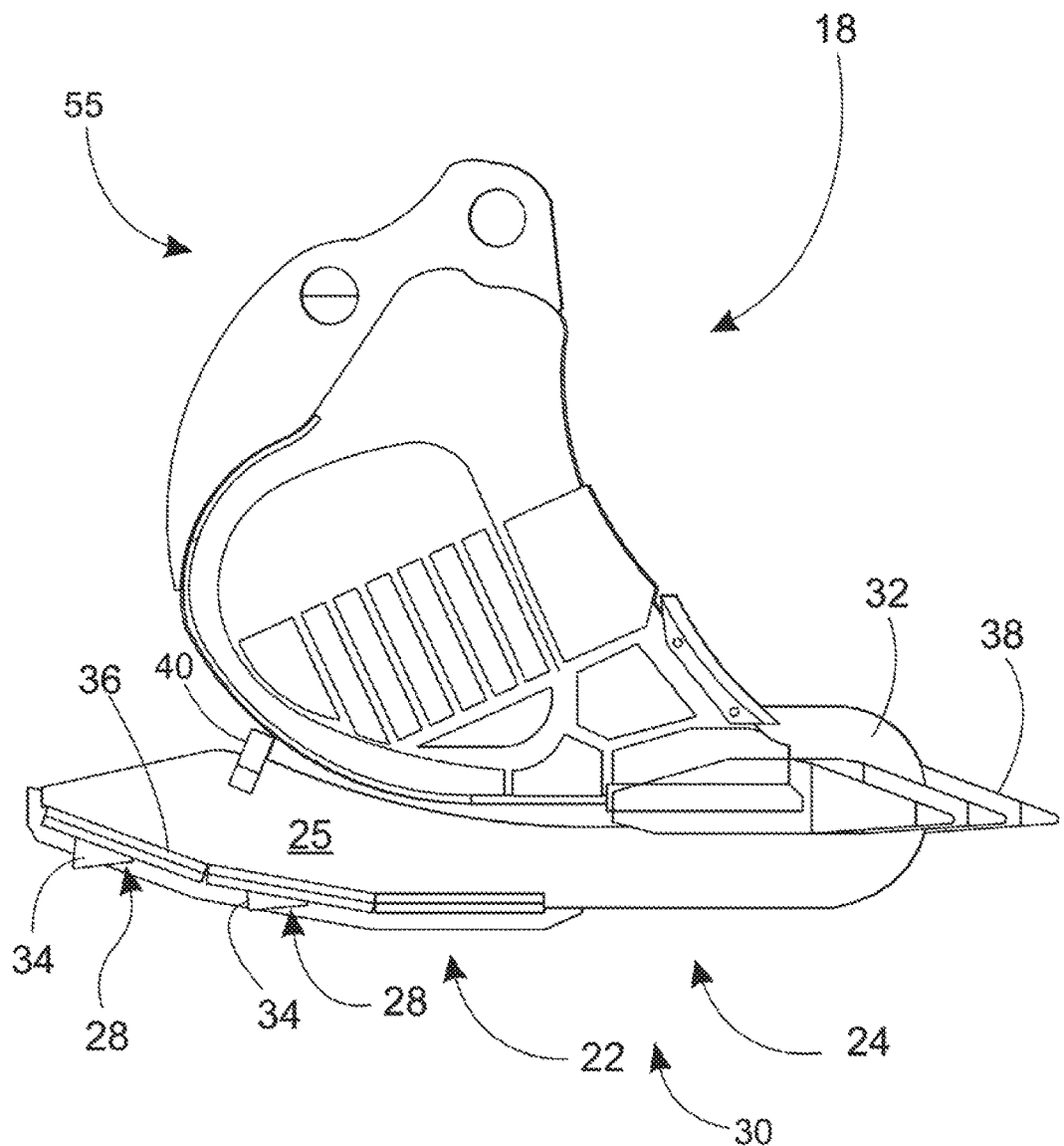
FIG. 2 shows a side view of the bucket of the excavator of the arrangement according to the invention, when the brake surface is arranged in a separate drag plate.
Figure 3:
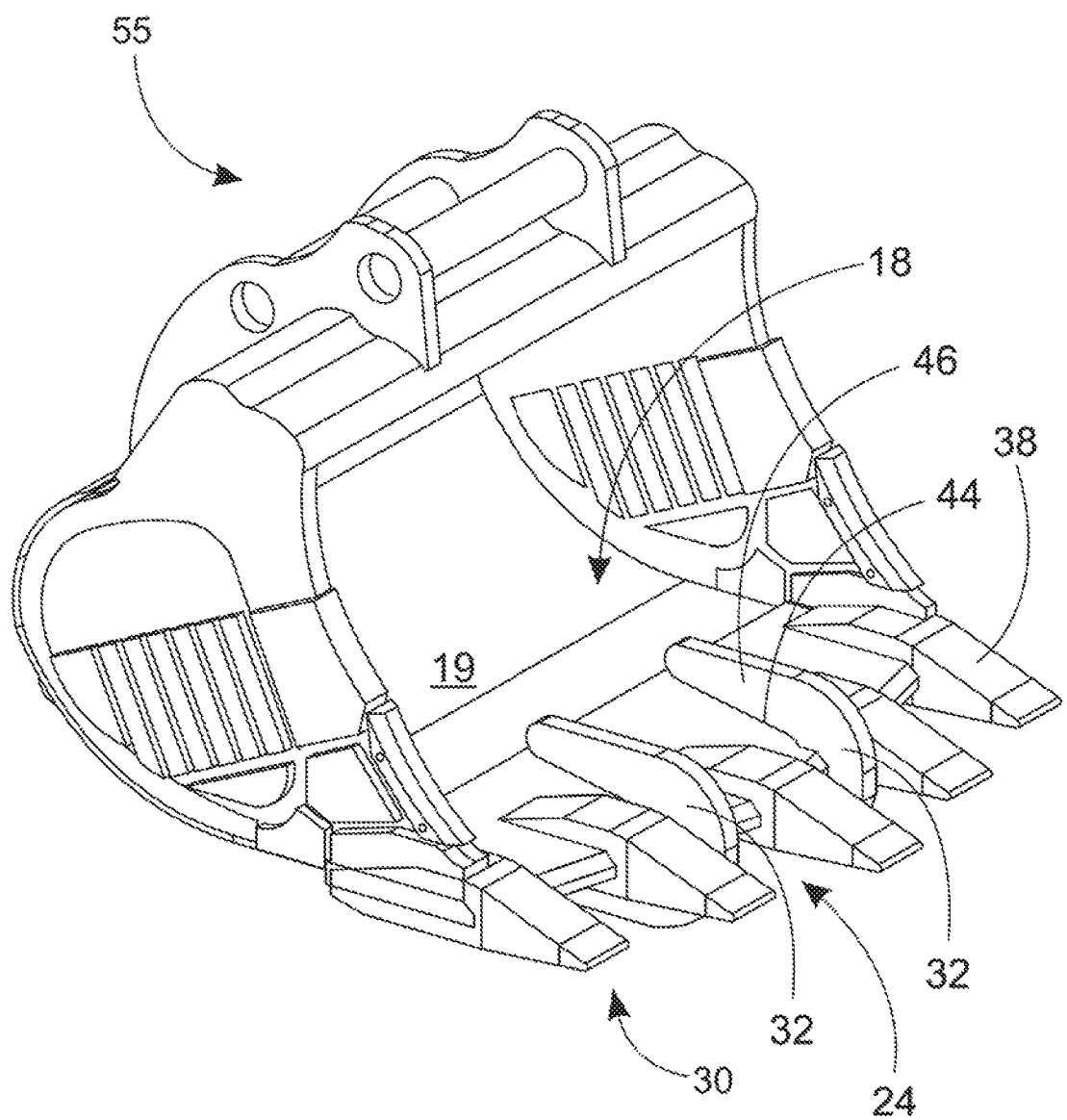
FIG. 3 shows an axonometric view at an angle from in front of the bucket of the excavator according to the invention, when the brake surface is arranged in a separate drag plate.

In the method according to the invention, the brake surface belonging to the brake means can be formed directly in the excavator's bucket, in a separate drag plate that is attached to the excavator's bucket, or in a separate transfer carriage. FIGS. 1*a*-4 show an embodiment, in which the brake surface 22 of the brake means 30 is formed in a drag plate 24. FIG. 2 shows a side view of the drag plate 24 in greater detail. The drag plate 24 can be a plate-like structure formed by welding metal pieces, which has its own frame 25 with the aid of which the drag plate 24 is attached to the bottom 19 of the excavator's bucket 18 (FIG. 4) for the duration of the transfer of the excavator. The attachment of the drag plate 24 to the bucket 18 can take place preferably with the aid of separate gripping plates 32, which form a shape-closing joint with the bucket 18. In other words, the gripping plates 32 can be plates parallel to the height direction of the bucket 18, in each of which a slot 44 is formed that is essentially parallel to the bottom plate 13 of the bucket 18, in accordance with FIG. 3. The part of the bucket 18 on the opposite side of the slot 44 relative to the brake surface 22 forms an gripping claw 46 for the drag plate 24. The gripping plates 32 are preferably situated at a distance from each other, so that they are located between the bucket's 18 claws 38. The bucket's 18 bottom plate 19 can be pushed into the slot 44 in the opposite direction to the direction of movement of the transfer vehicle. When the transfer of the excavator starts, the gripping plates 32 transmit the forwards moving force of the transfer vehicle to the excavator's bucket and simultaneously lock the excavator's bucket vertically to the drag plate 24. In addition, the bucket's 18 bottom plate 19 can include side supports 40 according to FIGS. 2 and 4, which prevent the drag plate 24 from moving transversely.

According to FIG. 2, the brake surface 12 can be a brake area 28 formed in the drag plate 24. Brake areas 28 with at least two different coefficients of friction can be incorporated in the brake area 28. Alternatively, the brake area can be formed directly in the bottom plate of the bucket. Having brake areas with different coefficients of friction seeks to obtain different braking effects using the same brake surface. The brake area with the smallest coefficient of friction can be used, for example, on rough gravel roads with a good grip, or similar bases. The second brake area with a higher coefficient of friction can be used, for example, on a wet road or a sandy-like base. The brake area with a third, even higher coefficient of friction can, in turn, be used, for example, on ice. In the brake surface, there are preferably at least two brake areas with different coefficients of friction, irrespective of whether the brake surface is formed directly in the bottom of the excavator's bucket or in a separate drag plate. The brake areas can also have surface areas that differ relative to each other, so that the broking effect can be altered by altering the brake surface, for example, from a smaller to a larger brake area. In the case of differing surface areas, the different brake areas can also have the same coefficient of friction, as the difference in braking effect is created by the difference in the surface areas of the brake areas.

Figure 4:
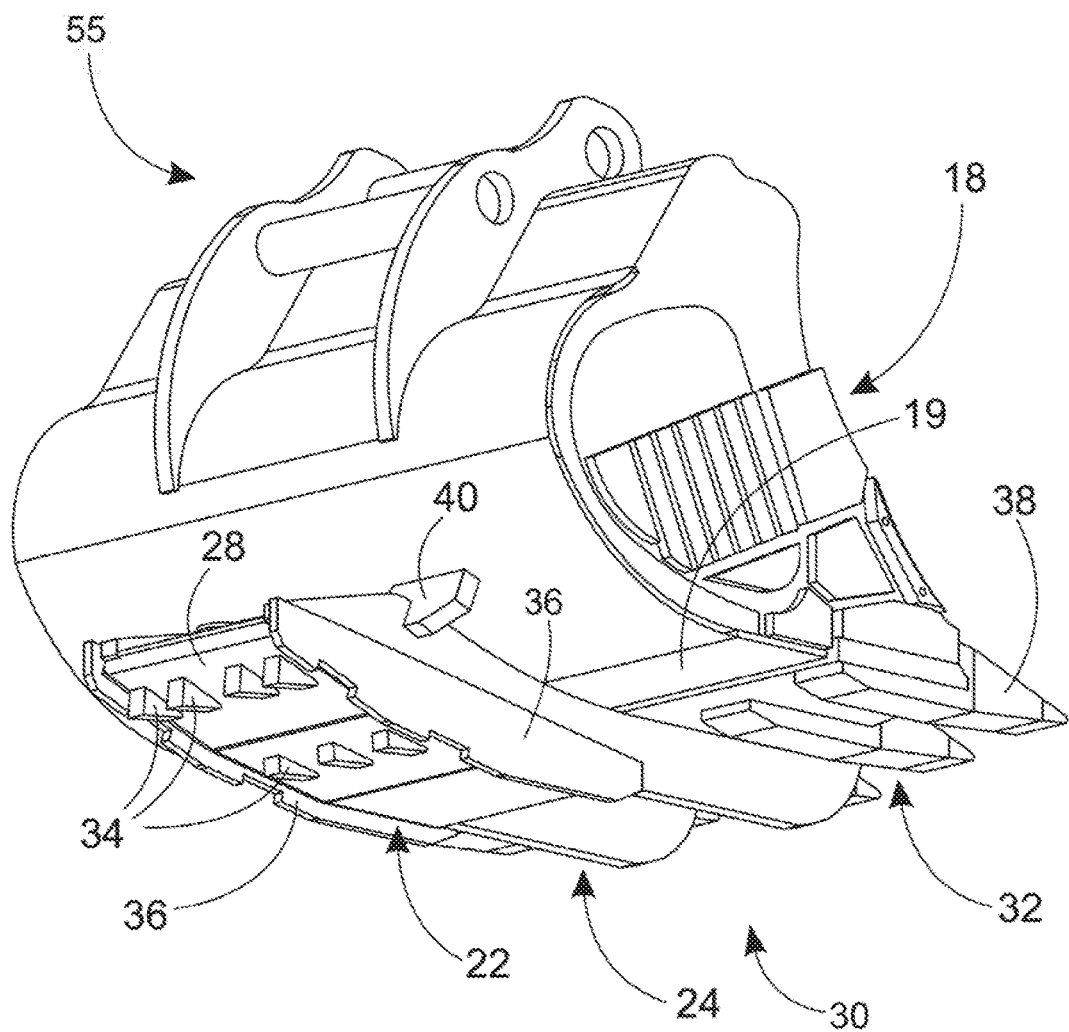
FIG. 4 shows an axonometric view at an angle from the rear of the bucket of the excavator according to the invention, when the brake surface is arranged in a separate drag plate.

According to FIGS. 2 and 4, each brake area 28 can be at an angle of 5-25°, preferably 10-15° relative to the adjacent brake area 28. Thus, the coefficient of friction of the brake surface 22 can be altered by rotating the bucket 18 around the pivot point between it and the set of booms, so that the part of the brake surface 22 in contact with the base changes from one brake area 28 to the other. According to FIG. 4, the brake area 28 can include brake claws 34, by means of which braking effect is obtained, in addition to the brake area 28 forming the brake surface 22. The brake claws are particularly useful in retarding a transfer on, for example, ice and snow. FIG. 4 also shows that the brake areas 28 of the brake surface 22 are situated between shoulders 36. The shoulders 36 lock the advantageously changeable brake areas 28 of the brake surface 22 to the structure of the frame 25 of the drag plate 24.

Figure 5:
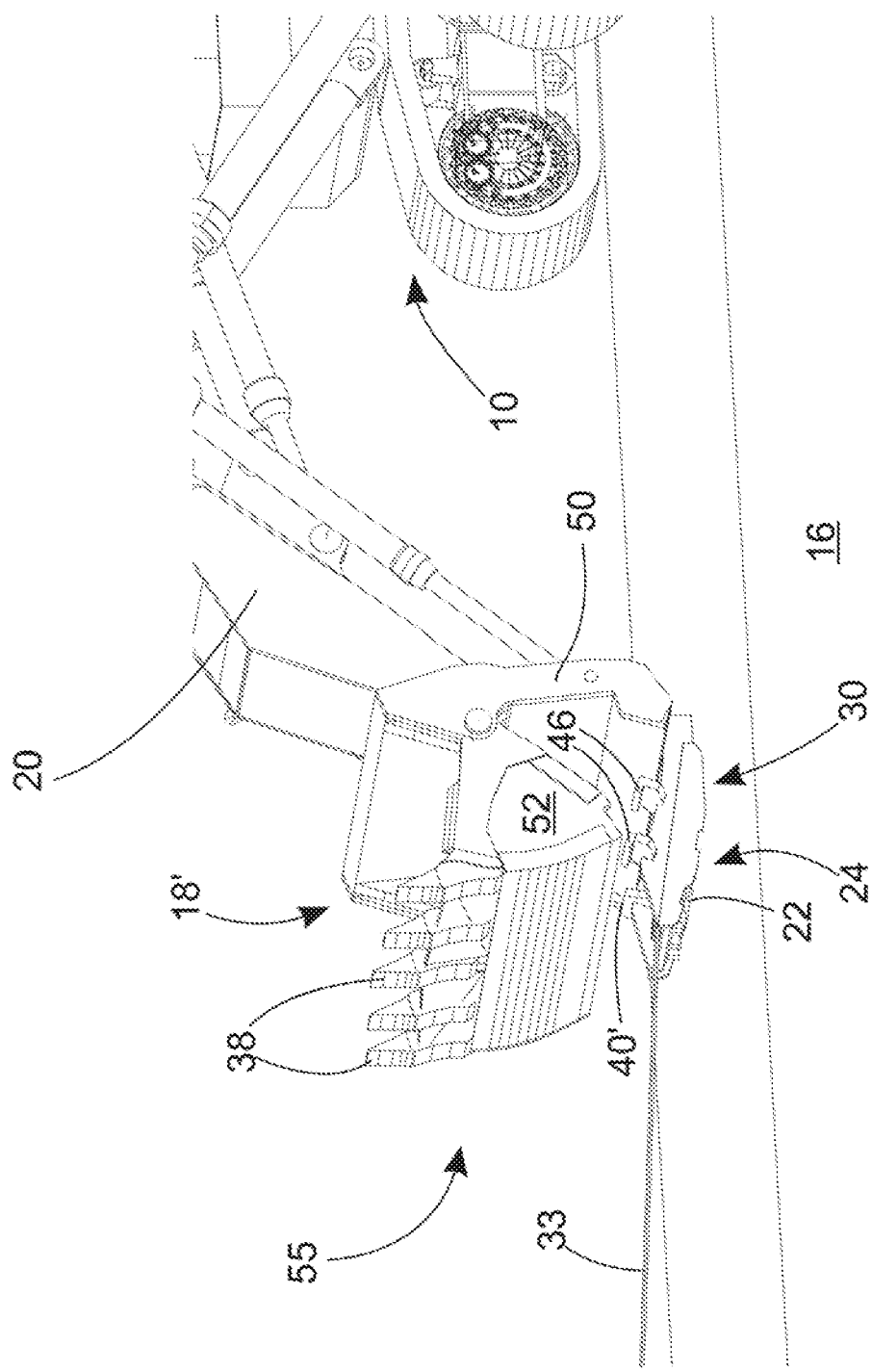
FIG. 5 shows an axonometric view of the bucket of the arrangement according to the embodiment of FIG. 1c in the open position when attaching the brake means.
Figure 6:
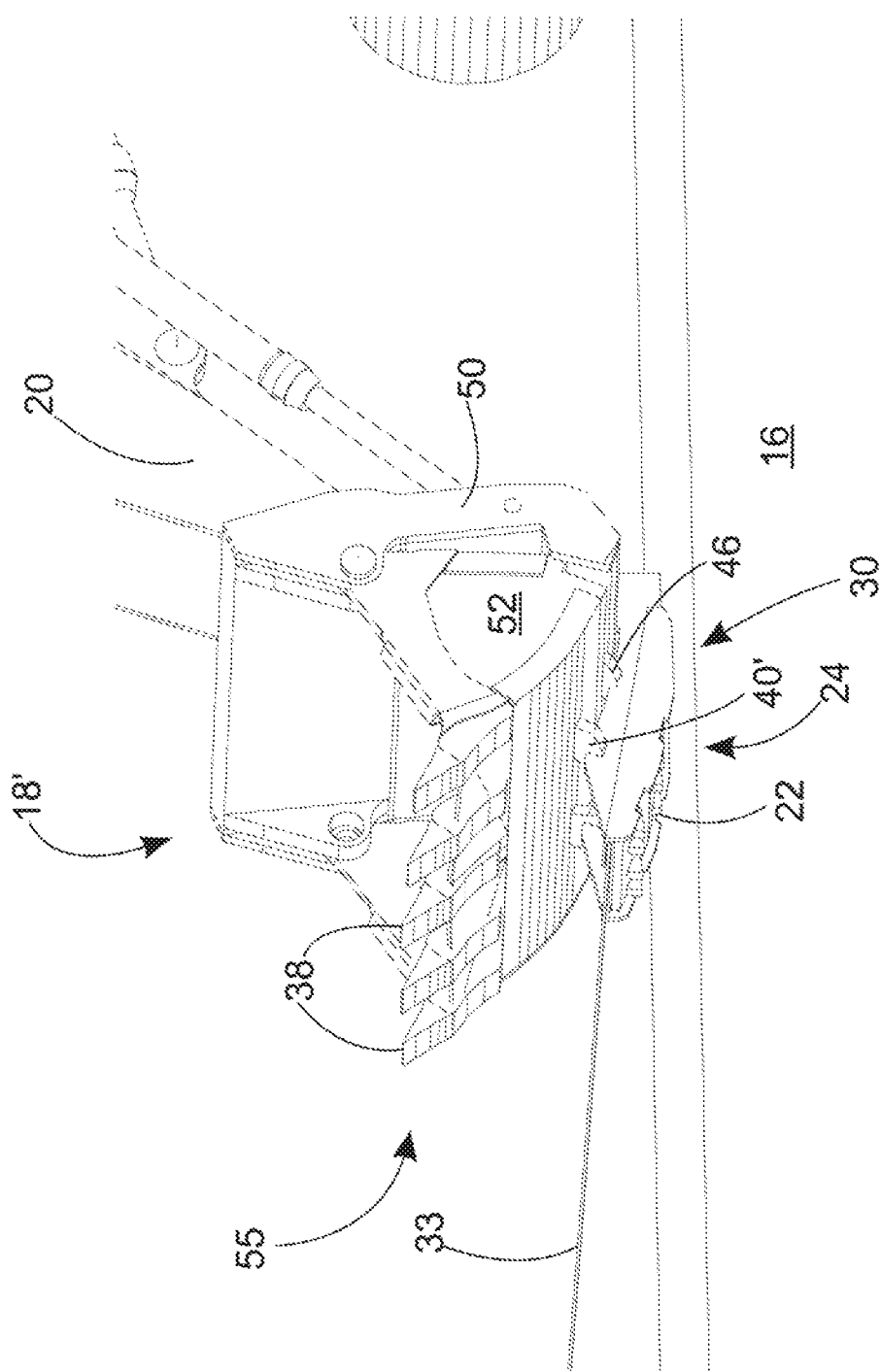
FIG. 6 shows an axonometric view of the bucket of the arrangement according to the embodiment of FIG. 1c in the closed position, when the brake means have been attached.
Figure 7:
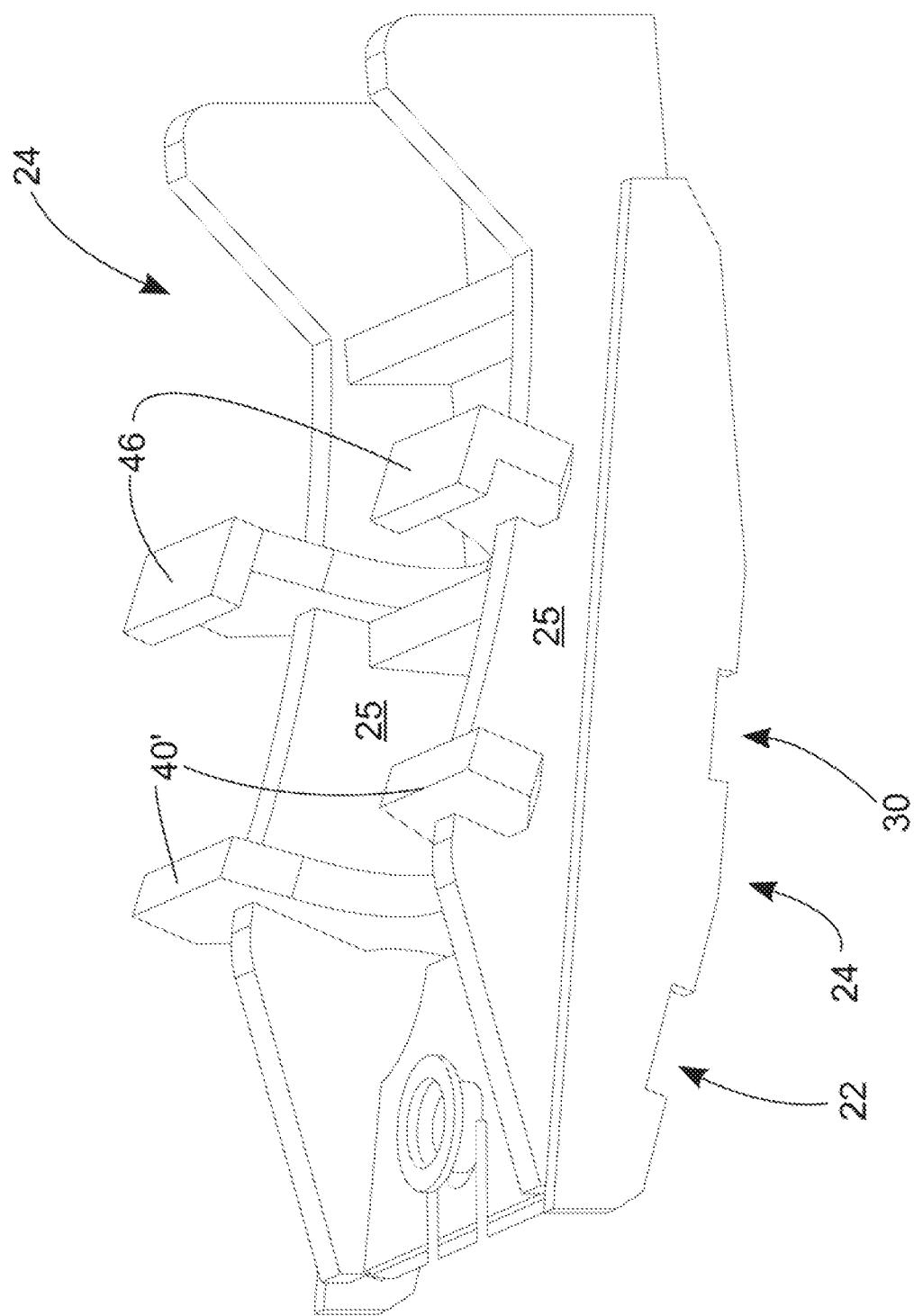
FIG. 7 shows an axonometric view of the brake shoe of the arrangement according to the embodiment of FIG. 1c, FIGS. 8a and 8b show a side view of a third embodiment of the arrangement according to the invention, seen when using two different types of bucket.
Figure 8A:
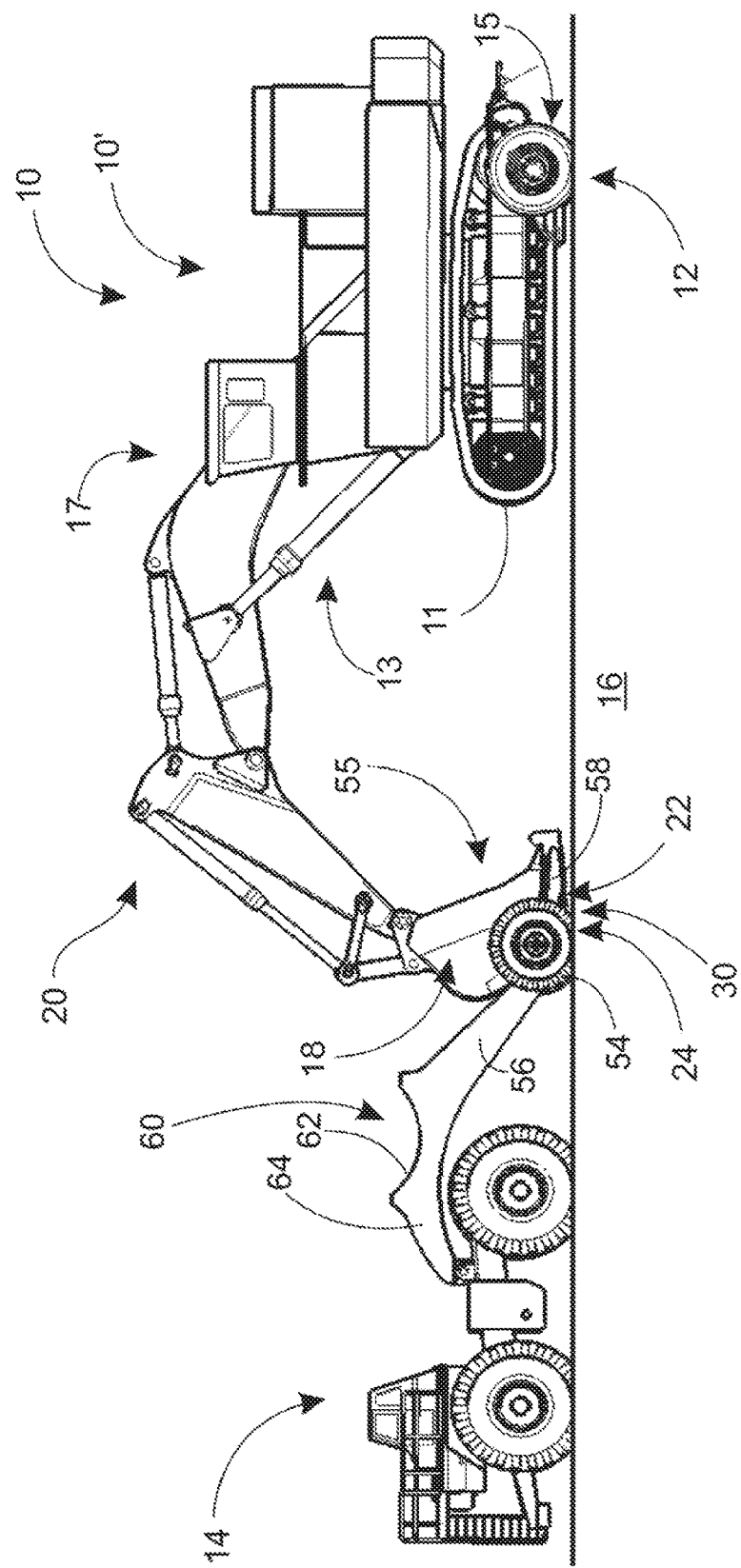
Figure 8B:
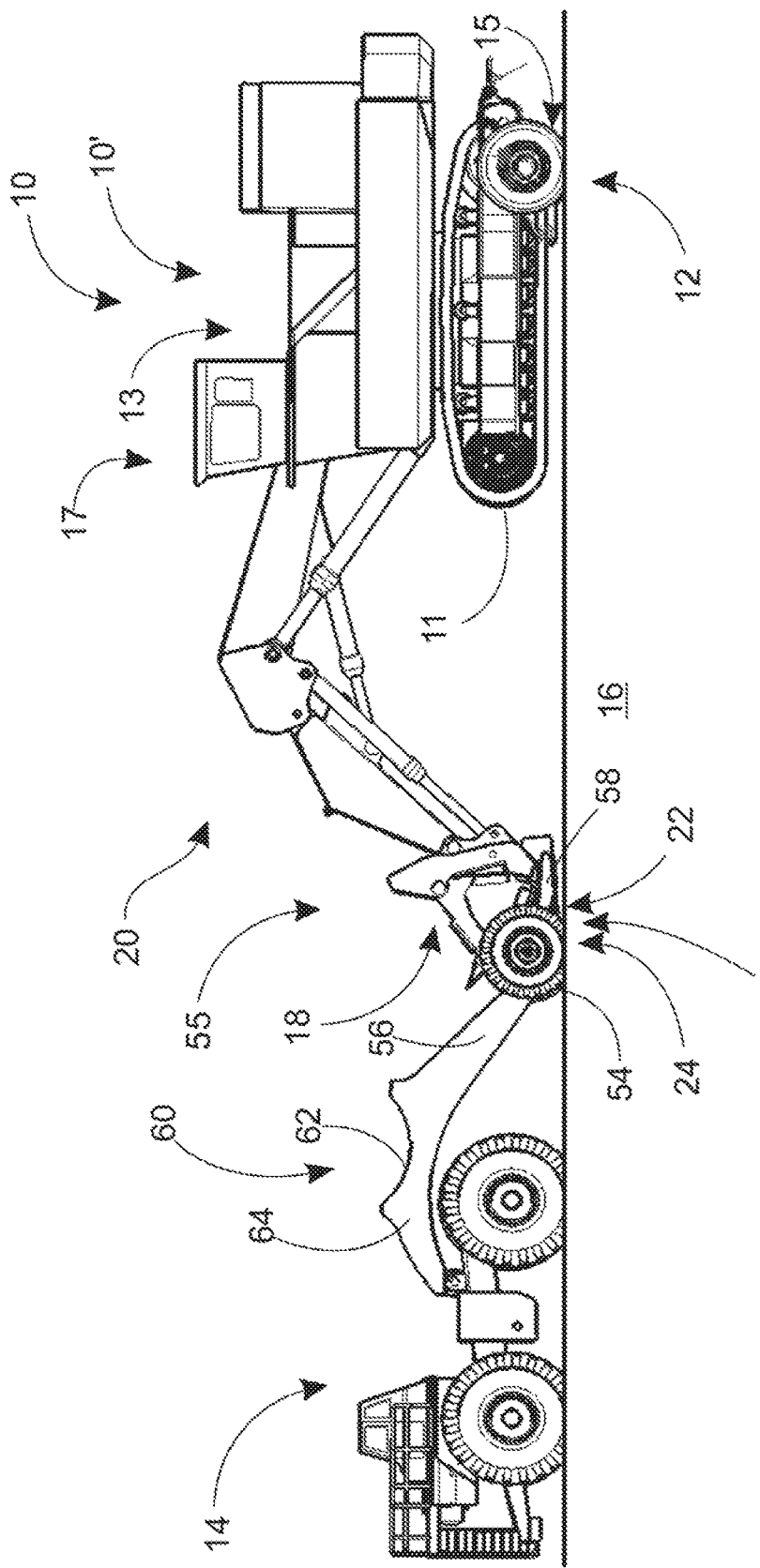
Figure 9A:
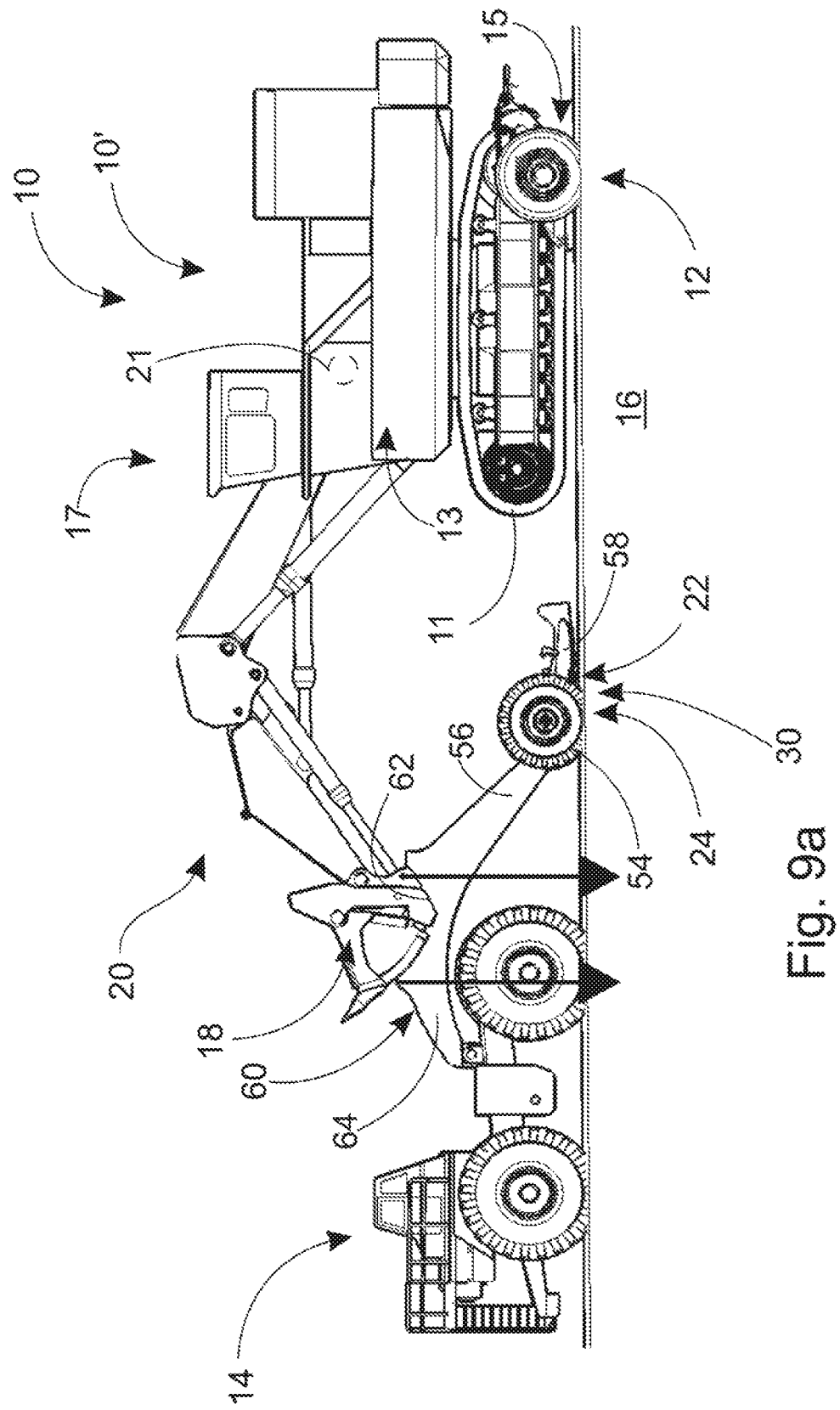
FIGS. 9a and 9b show a side view of a third embodiment of the arrangement according to the invention, seen when using two different types of bucket when the bucket is on the second possible support plane.
Figure 9B:
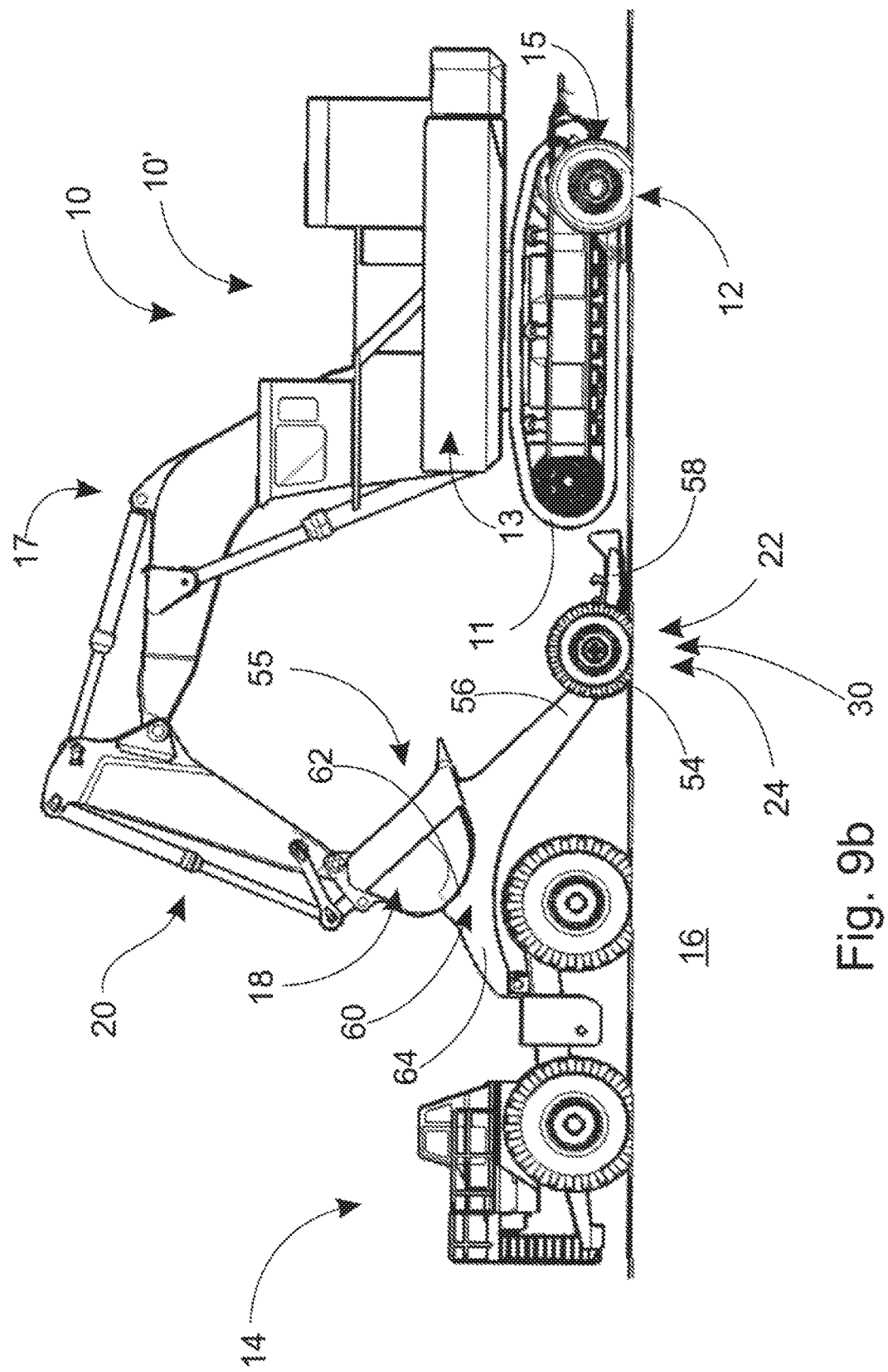
Figure 10A:
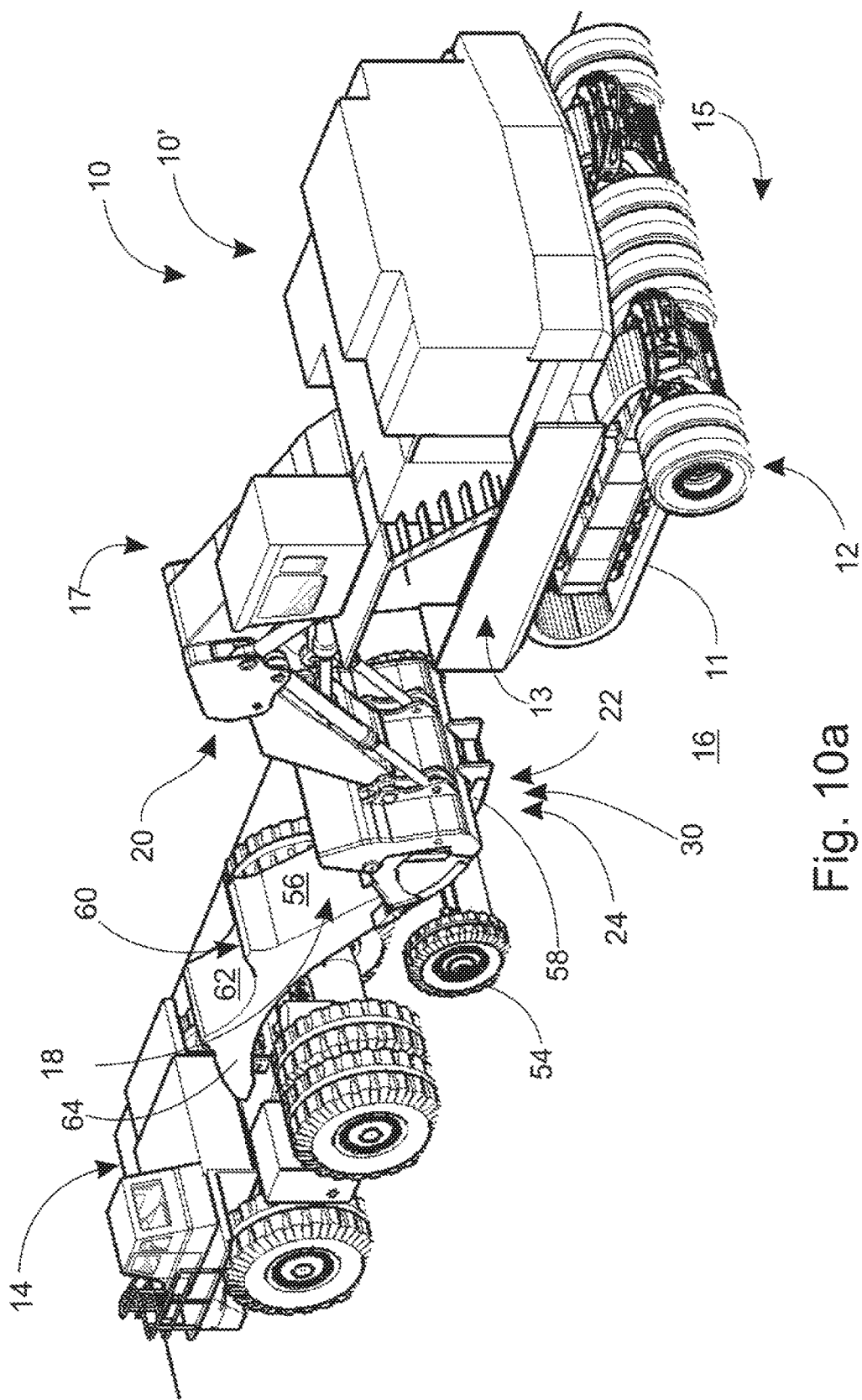
FIGS. 10a and 10b show an axonometric view seen at an angle from the rear when using two different types of bucket.
Figure 10B:
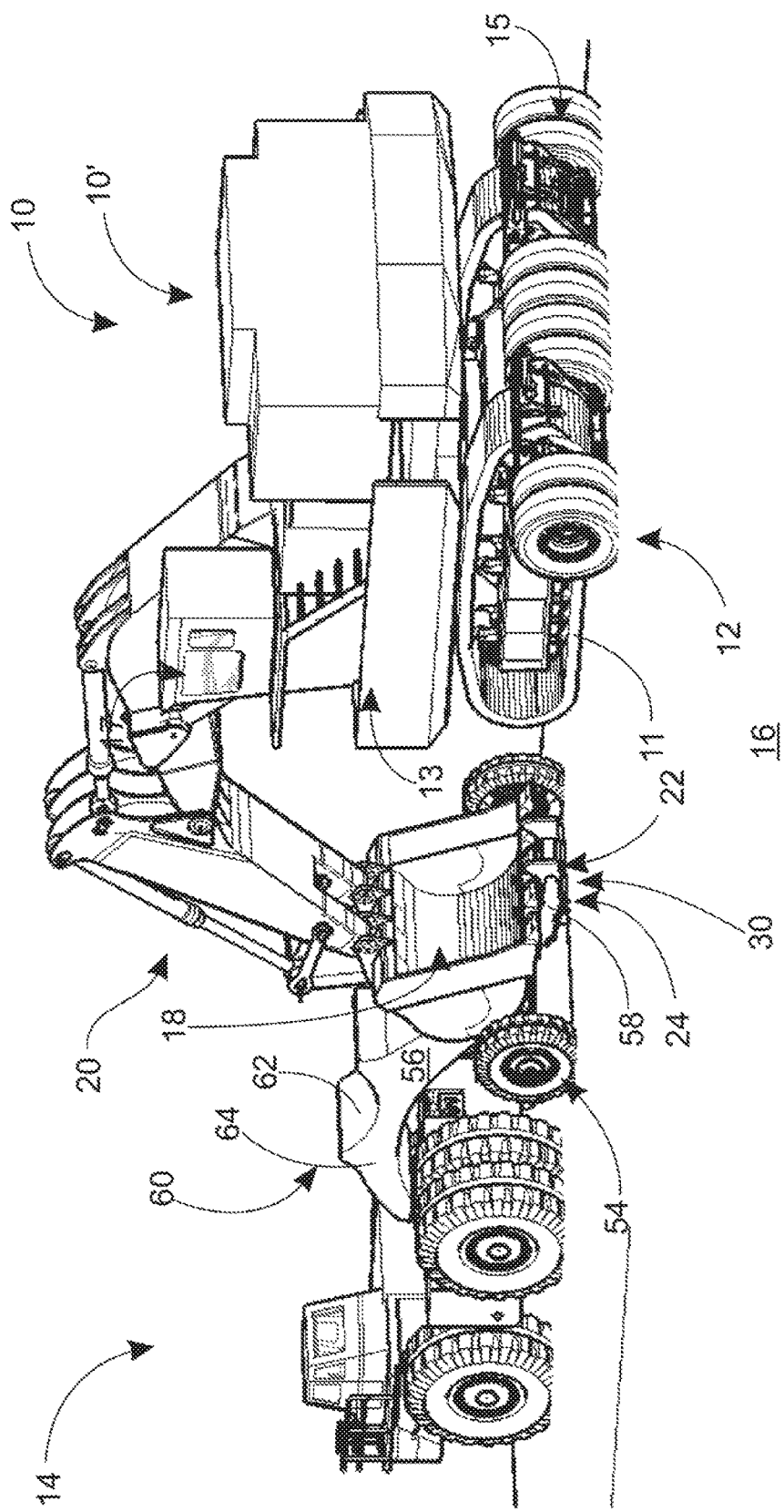
Figure 11B:
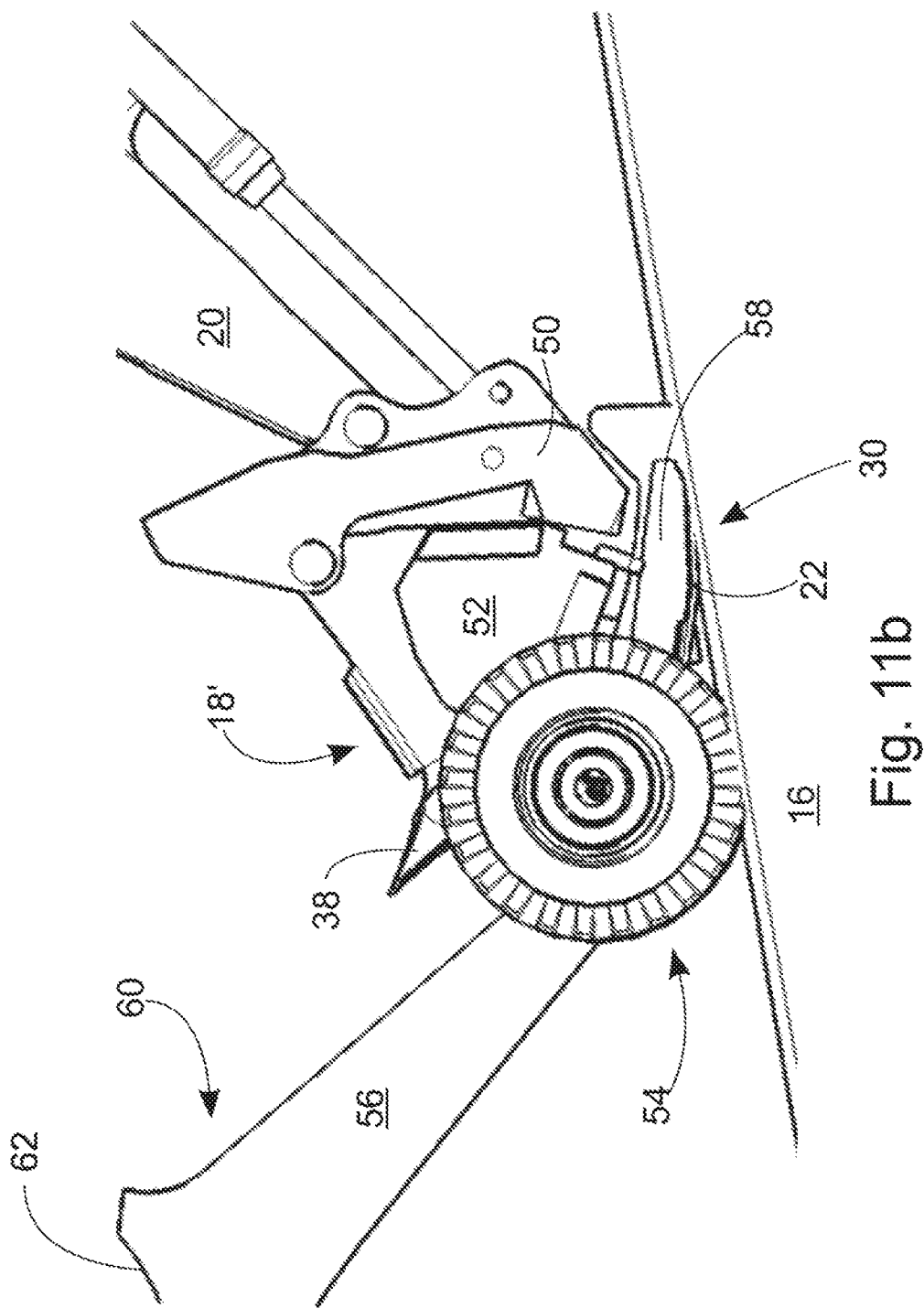
Figure 12:
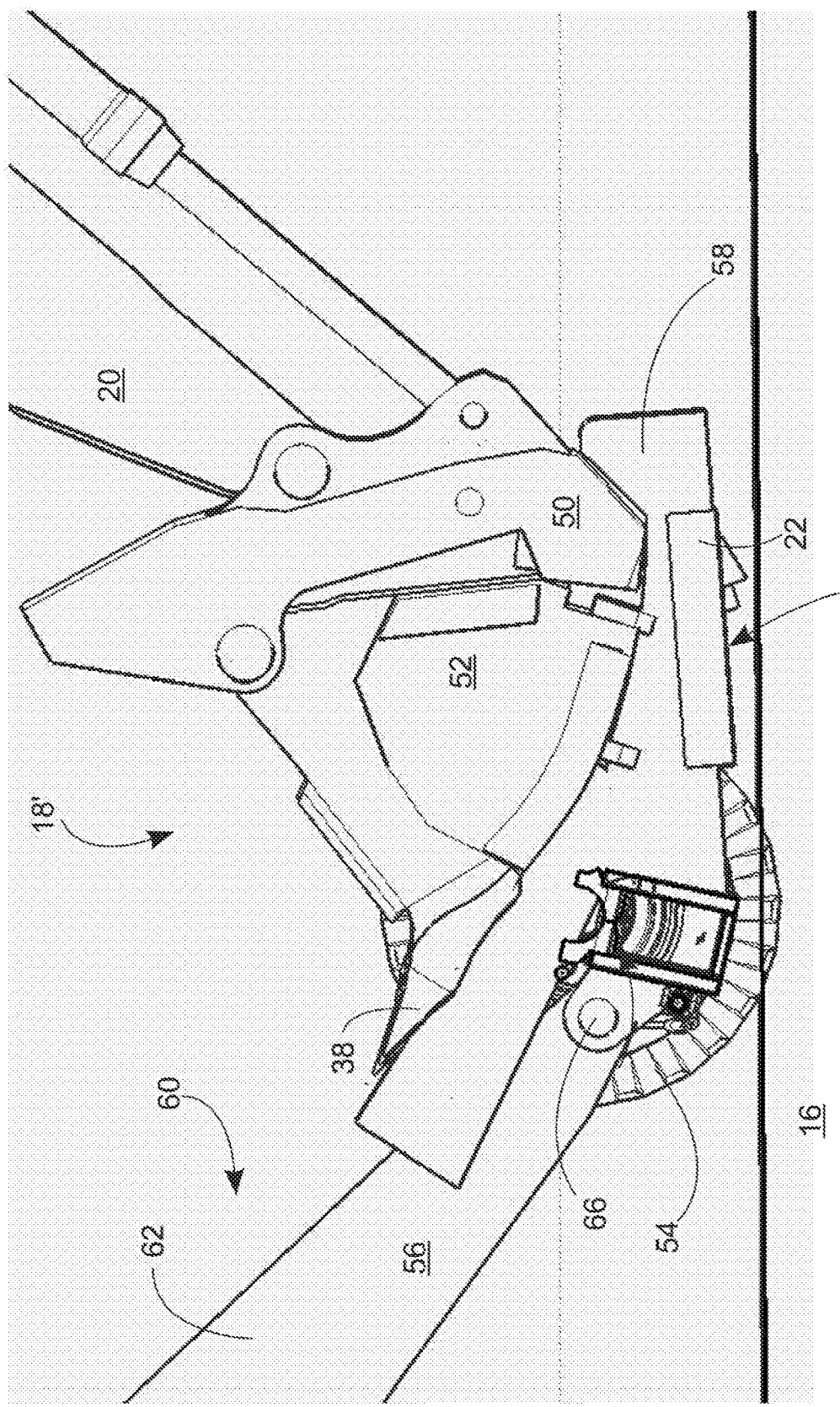

FIGS. 5 and 6 show the attachment of the brake means 30 of the arrangement according to the second embodiment of FIG. 1c to a dipper shovel 18'. The attachment preferably takes place in such a way that the jaw part 52 of the dipper shovel 18' is rotated around a pivot in such a way that the dipper shovel 18' opens and the drag plate formed in the drag plate 24 can be placed between the jaw part 52 and the body part 50. Preferably in this embodiment too the drag plate 24 includes gripping claws 46 and supports 40', with the aid of which the brake surface 22 is locked to the bottom of the dipper shovel 18', when, according to FIG. 6 the jaw part 52 is closed onto the body part 50. The gripping claws 46 and supports 40' can be seen more clearly in FIG. 7, in which a draw plate 24 according to a second embodiment is shown when detached.

FIGS. 8a-12 show a third embodiment of the arrangement according to the invention, in which the brake means 30 are fitted in connection with a separate transfer trailer 60 equipped with wheels 54. The transfer trailer 60 is preferably a transportation means attached, in such a way that it can be towed, to the transfer vehicle 14 with the aid of an arm 64, i.e. a curved gooseneck, which transportation means includes a brake surface 22 located on a second arm 58 of the other side of the transfer trailer relative to the wheels 54. The second arm 58 and the arm 64 are preferably connected to each other with the aid of a transverse pivot 86, in accordance with FIG. 12, which pivot 66 is situated in front of the axle of the wheels 54 attached to the second arm 58. In this case, in front refers to the arm's 64 side of the axle of the wheels 54. In this way, according to the invention, the brake surface 22 is weighted with the aid of the set of booms 20 of the work machine and braking is adjusted preferably by rotating the bucket 18 connected to the set of booms 20, which is locked to the second arm 58. Rotation of the bucket 18 rotates the second arm 58 around the axle of the wheels 54, so that the brake surface 22 comes into contact with the base 16. The transfer trailer also preferably includes locking means, with the aid of which the bucket is locked to the transfer trailer for the duration of the transfer. The locking means can be similar to those described in connection with previous embodiments.

In the transfer trailer there can be two separate support planes 62, according to FIGS. 8a-10b, on which the bucket 18 can be attached to the transfer trailer 60. The support plane 62, seen in FIGS. 8a and 8b, as well as in 10a and 10b, is between the wheels 54 of the transfer trailer 60 while in FIGS. 9a and 9b the support plans 62 is half-way along the arm 64. The attachment point used can vary according to the transfer vehicle being used. If the transfer vehicle 14 is of light construction, the friction between the wheels of the transfer vehicle 14 and the base 16 may be insufficient for towing a heavy work machine 10, in which case the support plane 62 according to FIGS. 9a and 9b can be used to attach the bucket 18 to the transfer trailer 60. The arm 64 can then foe pressed with the aid of the set of booms 20 in order to provide additional weight for the wheels of the transfer vehicle and in that way increase adhesion. Thick arrows pointing downwards from the support plane 62 are used in FIG. 9a to show the different points that can be pressed according to whether it is wished to increase or reduce the braking effect. By increasing pressure on the bucket 18, with the aid of the set of booms 20, at the location of the arrow on. the side near to the transfer vehicle 14, the loading can be increased on the transfer vehicle 14 and braking can be reduced, while, by increasing pressure at the point on the side nearest the work machine 10 by pressing the bucket 18 with the aid of the set of booms 20, loading can be increased on the brake surface 22 and the loading on the transfer vehicle 14 can be reduced.

Alternatively, if the transfer vehicle 14 is heavy and there is no problem with adhesion, the point shown in FIGS. 8a, 8b, 10a, and 10b can be used, to attach the bucket 18. According to the figures, the auxiliary device used in the work machine can be either a dipper shovel, or a back hoe, or similar.

According to one embodiment, the brake surface can be brought into contact with the base by using springing in the suspension of the wheels axle, which with a small pressure from the set of booms of the work machine keeps the brake stir face off the base, but, if the pressure is increased, permits the brake surface to contact the base. Such an implementation is especially suitable for the embodiment according to FIGS. 9a and 9b.

In the method according to the invention, the retardation of the transfer speed of the excavator is preferably adjusted on the basis of the towing force between the transfer vehicle and the excavator. The starting point for the adjustment can be regarded as being that, when the towing force is zero, the maximum braking effect is caused by the brake surface connected to the bucket of the excavator. Thus it can be ensured that the retardation of the excavator is always powerful when required. As the towing force increases, the braking effect can be reduced by rotating the brake surface in such a way that a change occurs to the brake surface's brake area with a smaller coefficient of friction. The magnitude of the towing force can be estimated visually, or on the basis of a separate measurement. On the basis of visual estimation or a measurement result, the excavator operator can rotate the bucket of the excavator to achieve the desired braking effect. Alternatively, a separate radio-control unit can be installed in the excavator, with the aid of which the braking power of the excavator can be adjusted by remote control from the transfer vehicle.

The arrangement according to the invention can also include, in addition to a sensor, a control device, which, on the basis of a preset control variable automatically adjusts the set of booms of the work machine being transferred, for example, an excavator, to control the braking effect. Braking can then take place entirely automatically. The control device 27 can also be manually operated and located in the excavator 10' as in FIG. 1a, the control device being for example a joystick for manual use.

In the method according to the invention, a set of transfer wheels like that disclosed in, for example, patent publication FI 101779 B or application publication WO 2013/124543 A1 can be used. The method, can be used, for example, to transfer a 250-tn excavator, in which about 30%, i.e. 75 tn of the excavator's mass is supported on the base by means of the bucket. The compressive force caused by the excavator 10' going downhill is then 22 tn. If the coefficient of friction between the brake surface and the base is 1, the required towing force will be a maximum of about 53 tn. For example, the maximum towing force of a Caterpillar CAT785D haul truck is 85 tn. The towing-force requirement is influenced by the surface area of the brake surface, the hardness of the base, the moisture content of the base, loose material on the base, and the attitude of the bucket.

The brake areas of the brake surface can be manufactured from a material suitable for the purpose, for example, wear-resistant steel, the hardness of which is more than 400 (HBW). Crushing-jaw surfaces known from jaw crushers, such as, for example, Metso's jaw-crusher blade surfaces known under the product name Nordberg C-series, which is made to withstand high stresses and is thus suitable for the purpose, can advantageously be used as the brake surfaces. Various kinds of patterning can also be formed in the surfaces of the brake areas, in order to vary the coefficient of friction.

The method according to the invention is preferably used when transferring a heavy work machine on a sloping base, for example downhill, but the method can also be used on a level base. The dragging braking of the brake surface on the base can also be used for levelling or ploughing the surfaces of she base, for example, a road.

The invention claimed is:

1. Method for slowing transfer of a heavy work machine on a sloping base using a separate transportation device equipped with wheels, the heavy work machine including a body, a crawler chassis fitted beneath the body, a set of booms having at least one operating cylinder, a first end and a second end, said set of booms being pivoted at the first end to the heavy work machine and a selected auxiliary device is pivoted at the second end, and a brake connected to the auxiliary device, the brake including a brake surface, the method comprising the steps of:
towing the heavy work machine using a transfer vehicle with the aid of the transportation device,
supporting the crawler chassis of the heavy work machine at least partly on top of the transportation device such that the crawler chassis is raised off the sloping base, and supporting the auxiliary device of the heavy work machine on the brake, the brake surface of the brake contacting the sloping base,
using said operating cylinder of the set of booms to press the brake surface against the sloping base to create friction to slow transfer speed of the transportation device on the sloping base, and
adjusting the pressing of the brake surface taking place through the auxiliary device using the operating cylinder of the set of booms.

2. Method according to claim 1, including the step of using a pair of transfer wheels fitted to only one end of the heavy work machine as the transportation device.

3. Method according to claim 1, wherein the step of towing the heavy work machine by the transfer vehicle includes towing by means of a rope.

4. Method according to claim 1, wherein the mass of the heavy work machine is more than 50 tn.

5. Method according to claim 1, wherein the mass of the heavy work machine is more than 100 tn.

6. Method according to claim 1, including the step of retarding the transfer speed by pressing the brake surface continuously on the sloping base, when towing the brake surface continuously with the aid of the transfer vehicle.

7. Method according to claim 1, including the step of providing a towing force to the heavy work machine through the set of booms.

8. Method according to claim 1, wherein the heavy work machine is an excavator and a bucket pivoted to the set of booms includes the brake surface.

9. Method according to claim 8, includes the step of maximizing the braking effect when starting to move and reducing the braking effect once the excavator is moving, by altering attitude of the bucket.

10. Method according to claim 1, wherein the step of adjusting braking effect includes altering attitude of the brake surface with the aid of the set of booms.

11. Method according to claim 1, including the step of measuring the braking effect actively to create measurement data and adjusting the braking effect automatically on the basis of the measurement data.

12. Arrangement for transferring a heavy work machine on a sloping base, the heavy work machine including a body, a crawler chassis fitted under the body, and a set of booms having at least one operating cylinder, a first end and a second end, said set of booms being pivoted at the first end to the heavy work machine and a selected auxiliary device pivoted at the second end of said set of booms, the arrangement comprising:
a separate transportation device equipped with wheels, on top of which transportation device the crawler chassis of the heavy work machine is arranged to be at least partly supported for a duration of transfer such that the crawler chassis is raised off the sloping base,
a transfer vehicle for towing the heavy work machine during the transfer, the crawler chassis of the heavy work machine being at least partly supported on top of the transportation device,
a brake including a brake surface connected to the auxiliary device at a distance from the body for retarding the transfer speed of the heavy work machine with the aid of friction and arranged to be pressed against the sloping base by using said operating cylinder of the set of booms with the aid of the auxiliary device to brake the transfer speed of the heavy work machine during the transfer with the aid of friction, and an operating device for using the operating cylinder to press the brake surface of the auxiliary device against the sloping base.

13. Arrangement according to claim 12, wherein the work machine is an excavator comprising the set of booms and a bucket pivoted to the set of booms.

14. Arrangement according to claim 13, wherein the brake surface forms part of the bucket.

15. Arrangement according to claim 13, including a separate transfer trailer arranged to be towed by the transfer vehicle, the transfer trailer including:
- a first arm for attaching the transfer trailer to the transfer vehicle,
- a second arm supported on the first arm by a transverse pivot,
- wheels supported on the second arm by an axle,
- a brake surface for braking the transfer of the work machine, arranged on an undersurface of the second arm,
- a support plane for supporting the bucket on the transfer trailer, and
- the support plane including locking means for locking the bucket to the transfer trailer.

16. Arrangement according to claim 15, wherein the second arm forms the support plane.

17. Arrangement according to claim 15, wherein the first arm forms the support plane.

18. Arrangement according to claim 12, including a tow rope between the transfer vehicle and the work machine.

19. Arrangement according to claim 12, wherein the brake surface is curved and a radius of curvature diminishes over a length of the brake surface to increase the braking effect.

* * * * *